(12) United States Patent
Sellakumar

(10) Patent No.: US 6,960,329 B2
(45) Date of Patent: Nov. 1, 2005

(54) METHOD AND APPARATUS FOR REMOVING MERCURY SPECIES FROM HOT FLUE GAS

(75) Inventor: Kumar Muthusami Sellakumar, Bridgewater, NJ (US)

(73) Assignee: Foster Wheeler Energy Corporation, Clinton, NJ (US)

( * ) Notice: Subject to any disclaimer, the term of this patent is extended or adjusted under 35 U.S.C. 154(b) by 568 days.

(21) Appl. No.: 10/095,013

(22) Filed: Mar. 12, 2002

(65) Prior Publication Data

US 2003/0185718 A1 Oct. 2, 2003

(51) Int. Cl.[7] .............................. B01J 8/00; C01B 21/00
(52) U.S. Cl. ........................................ 423/210; 423/235
(58) Field of Search ................... 423/210, 235

(56) References Cited

U.S. PATENT DOCUMENTS

| | | | |
|---|---|---|---|
| 5,435,980 A | 7/1995 | Felsvang et al. | 423/210 |
| 5,607,496 A * | 3/1997 | Brooks | 75/670 |
| 5,695,726 A * | 12/1997 | Lerner | 423/210 |
| 5,900,042 A | 5/1999 | Mendelsohn et al. | 75/742 |
| 6,136,281 A * | 10/2000 | Meischen et al. | 423/210 |
| 6,638,485 B1 * | 10/2003 | Iida et al. | 423/210 |
| 6,790,420 B2 * | 9/2004 | Breen et al. | 423/215.5 |
| 6,808,692 B2 * | 10/2004 | Oehr | 423/210 |

FOREIGN PATENT DOCUMENTS

| | | |
|---|---|---|
| EP | 0 583 878 A1 | 2/1994 |
| EP | 0 860 197 | 2/1998 |

* cited by examiner

*Primary Examiner*—Stanley S. Silverman
*Assistant Examiner*—Jonas N. Strickland
(74) *Attorney, Agent, or Firm*—Fitzpatrick, Cella, Harper & Scinto

(57) ABSTRACT

A method of removing mercury from flue gas containing mercury and particulate solids emanating from a fossil-fuel energy conversion plant and passing through a flue gas duct. The method includes (a) contacting the mercury in the flue gas with a solution containing at least one chloride-containing salt dissolved in a solvent by injecting the solution into the flue gas duct at an injection location, in order to oxidize mercury into $HgCl_2$, (b) heating the solution prior to or after step (a) to at least about 300° C., and (c) removing oxidized mercury from the flue gas with a device for removing particulate solids from the flue gas.

12 Claims, 3 Drawing Sheets

METHOD AND APPARATUS FOR REMOVING MERCURY SPECIES FROM HOT FLUE GAS

BACKGROUND OF THE INVENTION

The present invention relates to a method and an apparatus for removing mercury species, in particular, elemental mercury, from hot flue gas produced in a fossil-fuel energy conversion plant.

Exposure to high levels of mercury is associated with serious neurological and developmental effects in human beings. Concentrations of mercury in air are usually low and of little concern, but once mercury enters water, it can accumulate in fish and cause harm to people who eat mercury-contaminated fish. Fossil fuels contain many heavy metals, including mercury. Even if the levels of mercury in coals are low, usually between about 0.05 and 0.2 ppmw, mercury emissions from coal-fired power plants have recently been determined to pose a significant hazard to public health. Thus, the reduction of mercury in the exhaust gases of utility power plants is of great importance.

It is known that exhaust gases of fossil-fuel fired power plants may contain mercury in elemental, oxidized, and particulate forms. Elemental mercury in the exhaust gases does not stick to soot and other particles, but tends to remain in vapor form even after the exhaust gases are cooled to about 65° C. Therefore, elemental mercury in the exhaust gases is not recovered by conventional dust removal devices, such as, electrostatic precipitators, fabric filters, or conventional scrubbers, but is, instead, released into the atmosphere.

High mercury emissions in the exhaust gases from municipal solid waste incinerators are often regulated with powdered, activated carbon being injected into the exhaust gases upstream of the air pollution control devices. However, the level of mercury emissions per unit volume of flue gases from power plants is about one or two orders of magnitude lower than that emitted from waste incinerators. This makes it very difficult to capture such low mercury concentration levels from power plants by using the current activated carbon technology in a cost-effective manner.

Many fuels contain chlorine, which reacts with a portion of the mercury in the flue gases to form mercury chlorides. Gaseous mercury chlorides tend to condense on fly ash particles or on high surface area sorbents, which may effectively be removed from exhaust gases by conventional dust removal devices. Mercury chlorides are also highly soluble in water and, thus, they may be removed from the flue gas by absorption in the aqueous solutions of wet scrubbing units.

Early studies on trace elements released from coal combustion systems have shown that an increase in chlorine content in the furnace of the combustion systems leads to an increase in $HgCl_2$ formation and that a spray dryer is effective in removing $HgCl_2$ from the flue gas exiting the furnace. More recently, patents have disclosed mercury reduction methods to be used with specific flue gas cleaning equipment, which methods include increasing the Cl-content in the exhaust gas.

U.S. Pat. No. 5,435,980 discloses increasing the amount of chloride supplied to a spray dryer when cleaning flue gas that results from combusting coal having a low chloride content in order to convert elemental Hg to $HgCl_2$. The chloride increase is performed by incorporating, e.g., an alkaline metal salt solution in the aqueous suspension of basic absorbent in the spray dryer, by supplying chlorine-containing material to the coal in the furnace or by injecting gaseous HCl into the flue gas downstream of the furnace. Alternatively, U.S. Pat. No. 5,900,042 suggests reacting a gas stream with, e.g., a chlorine solution or chloric acid ($HClO_3$) to convert elemental mercury in the gas stream to soluble mercury compounds, and passing the gas stream through a wet scrubber.

European patent publication No. 0 860 197 suggests adding a mercury chlorinating agent, e.g., hydrogen chloride (HCl) or ammonium chloride ($NH_4Cl$), to exhaust gas upstream of a catalytic $NO_x$ reduction unit to convert elemental mercury into mercury chloride ($HgCl_2$) on the denitrating catalyst. In this method, the water-soluble $HgCl_2$ is removed in a wet desulfurizing unit with an alkaline absorbing solution. This method is usable only in systems comprising a denitrating catalyst.

All the methods discussed in the patents referred to above, however, may suffer from poor mercury removal efficiency at low mercury levels and/or cause corrosion in the exhaust gas duct.

SUMMARY OF THE INVENTION

An object of the present invention is to provide a new and efficient method and apparatus for removing mercury from hot flue gas.

Another object of the present invention is to provide a method and an apparatus for effectively removing low levels of mercury from a voluminous flue gas stream.

A further object of the present invention is to provide a method and an apparatus for effectively removing mercury from hot flue gas and minimizing corrosion in a flue gas duct.

Still a further object of the present invention is to provide a low cost method and apparatus for simultaneously removing mercury and nitrogen oxides from hot flue gas.

In order to achieve these and other objects of the present invention, a novel method of removing mercury from flue gas is provided, as described in the independent method claim. Thus, the present invention provides a method of removing mercury from flue gas containing mercury and particulate solids emanating from a fossil-fuel energy conversion plant and passing through a flue gas duct. The method comprises the following steps: (a) contacting the mercury in the flue gas with a solution containing chloride-containing salt dissolved in, for example, water by injecting the solution into the flue gas duct at an injection location in order to oxidize mercury into $HgCl_2$, (b) heating the solution prior to or after step (a) to at least about 300° C., and (c) removing oxidized mercury from the flue gas with means for removing particulate solids from the flue gas.

Also, the present invention provides a novel apparatus for removing mercury from flue gas, as described in the independent apparatus claims. Thus, the present invention provides an apparatus for removing mercury from flue gas containing mercury and particulate solids emanating from a fossil-fuel energy conversion plant. The apparatus comprises a flue gas duct for conveying exhaust gases; either (i) means for heating a solution of chloride-containing salt dissolved in, for example, water to at least about 300° C. and means for injecting the solution into the flue gas duct, or (ii) means for injecting a solution of chloride-containing salt dissolved in water into an upstream portion of the flue gas duct, for oxidizing mercury in the flue gas to $HgCl_2$, and means for removing particulate solids and oxidized mercury condensed on the particulate solids from the flue gas.

When the flue gas cools, the oxygen in the flue gas oxidizes at least a portion of the Hg to HgO. A small fraction of the HgO condenses on fly ash particles in the flue gas and, thus, can be removed from the flue gas with means for removing particulate solids from the flue gas, such as an electrostatic precipitator or a fabric filter.

A basic idea of the present invention is that elemental mercury in the flue gas is effectively oxidized to mercury chlorides by contacting the mercury with a solution containing chloride-containing salt dissolved in a solvent such as water and heated to at least about 300° C. During heating, the salt in the solution dissociates into molecules and ions. Thus, heating of the solution improves the capability of the salt to convert the mercury in the flue gas to $HgCl_2$.

According to a preferred embodiment of the present invention, the injection location is selected so that either (i) the flue gas temperature therein is from about 650° C. to about 980° C., causing the solution to be rapidly heated to at least about 300° C. in the flue gas duct, or (ii) the flue gas temperature therein is below about 650° C. and the solution is heated to at least about 300° C. prior to its injection into the flue gas duct.

According to a preferred embodiment of the present invention, the chloride-containing salt is ammonium chloride ($NH_4Cl$). When a solution of $NH_4Cl$ in a solvent such as water is injected into the flue gas duct in an injection location at which the flue gas temperature is above about 650° C., the $NH_4Cl$ in the solution is rapidly heated up and dissociates into many forms, including $Cl^-$ and $NH4^+$ ions, and $Cl_2$, $NH_3$ and HCl molecules. When the flue gas cools down in the flue gas duct, the chlorine species react with Hg and HgO at and below about 370° C., and mostly $HgCl_2$ is formed. The injection location is preferably at an upstream portion of the flue gas duct so that the chlorine species formed from the $NH_4Cl$ have sufficient retention time to convert most of the elemental mercury to $HgCl_2$.

Preferably, the injection location is such that the temperature of the flue gas is above about 700° C., even more preferably above about 800° C. At these temperatures, the $NH_3$ formed from the $NH_4Cl$ reduces the nitrogen oxide level of the flue gas according to a selective non-catalytic reduction (SNCR) process. However, the reaction rate of $NH_3$ with NOx decreases substantially below about 700° C.

When the energy conversion plant comprises a circulating fluidized bed boiler, the $NH_4Cl$ solution is advantageously injected immediately downstream of the furnace of the boiler, preferably in the channel between the furnace and the hot loop cyclone of the boiler. At this location, the temperature is typically above about 800° C., and the concentration of ash and unburned fuel particles is relatively high. In a plant comprising a pulverized coal combustor, the $NH_4Cl$ is advantageously injected immediately downstream of the furnace, where the temperature is typically above about 800° C., and the exhaust gas still contains unburned carbon particles.

The $NH_4Cl$ solution is advantageously heated to some extent, e.g., to between about 100° C. and about 200° C., before it is injected into the flue gas duct. The higher initial temperature of the solution speeds up the dissociation of $NH_4Cl$ into many ions and molecules in the flue gas duct, thus assuring that the desired chlorine compounds and ions are formed before the flue gas is cooled to about 370° C., where significant $HgCl_2$ formation begins.

According to another preferred embodiment of the present invention, the $NH_4Cl$ solution is first heated to above about 300° C. so that the $NH_4Cl$ molecules dissociate e.g., into $NH_3$ and HCl molecules, before the solution is injected into the flue gas duct. In this way, the solution can be injected into flue gas at a lower temperature, because HCl and other chlorine compounds and ions can immediately react with Hg and form $HgCl_2$. Simultaneously, the injected $NH_3$ can be utilized for reducing the $NO_x$ level of the flue gas, e.g., in a selective catalytic reduction (SCR) unit.

According to still another preferred embodiment of the present invention, the chloride-containing salt is selected from a group consisting of sodium chloride (NaCl), potassium chloride (KCl) and calcium chloride ($CaCl_2$). Similar to the other preferred salts, these salts can be injected into a high temperature zone of the flue gas duct and be rapidly heated therein to at least about 300° C., or they are heated at least to a minimum temperature before being injected into a lower temperature zone of the flue gas duct. The minimum heating temperatures vary with the form of the chloride-containing salt, but generally they are between about 300° C. and about 700° C.

The $HgCl_2$ molecules have a much higher tendency to condense on fly ash particles in the flue gas than does elemental mercury. When a sufficient amount of chloride-containing salt is injected into the flue gas as described above, practically all of the elemental mercury in the flue gas is oxidized, and the amount of remaining elemental mercury is reduced to trace levels. Conventional low-temperature dust collectors, advantageously located at a temperature between about 130° C. and about 170° C., can be used to remove more than about 90% of the oxidized or particulate mercury. The dust collector may be, e.g., an electrostatic precipitator or a fabric filter. Between these two alternatives, the fabric filter seems to be more effective. I believe this is because $HgCl_2$ molecules have a higher probability of condensing on the dust collected on the filter bags.

To increase the probability of the $HgCl_2$ molecules condensing onto the particles in the flue gas, the amount of fly ash can be advantageously increased by circulating a portion of fly ash collected in the particulate removing equipment back to the flue gas duct. Preferably, the portion of the circulated fly ash is selected so that the fly ash content in the flue gas is increased to at least about 1 $g/Nm^3$. The solids concentration in the flue gas can rise as high as to about 1000 $g/Nm^3$, depending on variables such as the ash surface porosity, sulfur oxides level, chlorine concentration in the input solids, moisture content of flue gas and operating temperature.

The circulated fly ash may also be treated before it is injected back to the flue gas duct, thereby improving its ability to remove the $HgCl_2$ from the flue gas. One method of treating the fly ash entails screening out larger particle from the smallest particles, e.g., by a cyclone, from the fly ash before reinjecting the fly ash into the flue gas duct. Thus, the fine particle fraction increases the mercury chloride removal, especially because of its high surface area and porous surface structure, which is related to its relatively high content of unburnt carbon. Depending on its composition, the fly ash can also catalyze the oxidation of elemental mercury in the presence of HCl in the flue gas. This effect can be enhanced by adding to the recirculated fly ash substances which catalyze the oxidation of mercury, e.g., trace metal oxides such as $Fe_2O_3$ or CuO.

Mercury removal can be further improved by removing the $HgCl_2$ molecules, which have not been removed from the flue gas with a dust collector. At least a portion of the remaining $HgCl_2$ molecules can be removed by the absorbing material or solution in a spray dryer or a wet scrubber located downstream in the flue gas duct.

The price of $NH_4Cl$ is about the same as that of activated carbon. However, while the reaction between Hg and Cl-containing particles, e.g., HCl molecules, is a gas phase reaction, no physical adsorption is required and, thus, for the same mercury reduction effect, the required quantity of $NH_4Cl$ is less than that of activated carbon. Also, when the use of activated carbon for mercury reduction is avoided, the increase of carbon in the ash is avoided. This improves the beneficial uses of the ash.

The quantity of chloride-containing salt used in the injection depends on the type of fuel employed and, especially, on the mercury and chlorine content of the fuel. When there is more chlorine in the fuel, less salt is required for sufficient mercury oxidation. According to a preferred embodiment of the present invention, the quantity of injected chloride-containing salt is such that the level of chlorine in the flue gas is equal to or less than that which would result from combusting fuel having a fuel chlorine content of 0.3% in dry fuel feed. For example, the desired chlorine concentration of the flue gas may correspond to that created by fuel having a 0.1–0.2% chlorine content, i.e., typically about 100 to about 200 ppm chlorine concentration in the flue gas.

Advantageously, a molar ratio of at least 100:1 between the HCl and Hg levels in the flue gas is used in oxidizing the Hg to $HgCl_2$. When mercury levels are low, the required ratio of the HCl and Hg levels in the flue gas may be much more than 100:1, e.g., 1000:1 or even more up to 50000:1. An upper limit for the quantity of chloride-containing salt used in the injection is determined by a desire to avoid any corrosion of the flue gas duct or the heat recovery surfaces and other equipment therein.

The present invention provides a novel method and apparatus for adding chlorine species into mercury-containing flue gas, wherein the method and apparatus improve the use of the injected chlorine. By properly selecting the injection location and the temperatures of the exhaust gas and the chloride-containing salt solution at the injection, more efficient use of the chlorine is obtained. Hence, the amount of excess chlorine and, hence, corrosion of the flue gas duct are minimized.

The present invention can be applied to many types of fossil-fuel conversion plants. These include, e.g., circulating and bubbling fluidized bed combustors and gasifiers, pulverized fuel firing and gasifying plants and waste incinerators.

BRIEF DESCRIPTION OF THE DRAWINGS

The above brief description, as well as further objects, features and advantages of the present invention will be more fully appreciated by reference to the following detailed description of the presently preferred, but nonetheless illustrative, embodiments in accordance with the present invention, when taken in conjunction with the accompanying drawings, wherein.

DETAILED DESCRIPTION OF THE PREFERRED EMBODIMENTS

Figure 1:
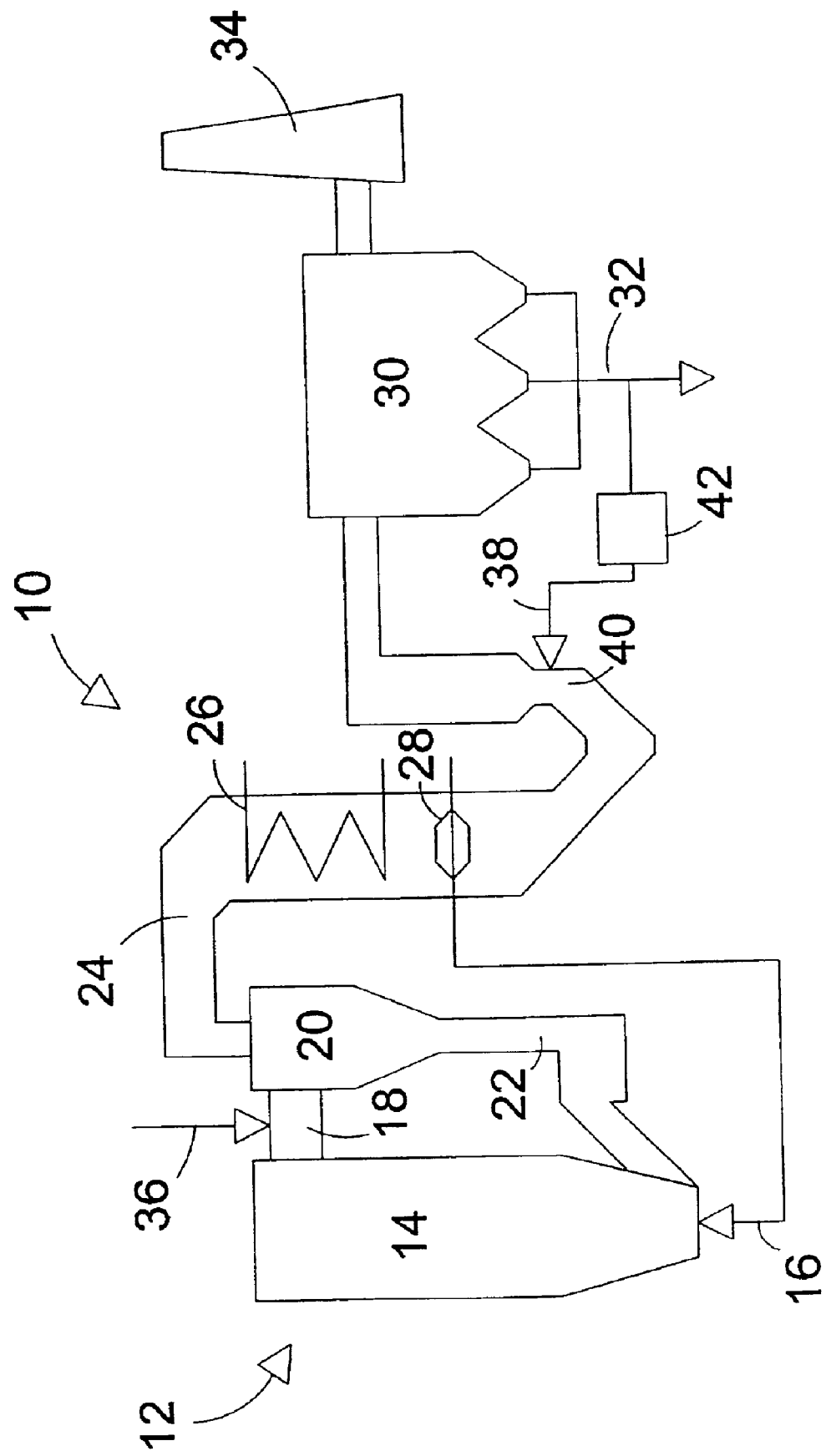
FIG. 1 shows schematically a boiler plant according to a first preferred embodiment of the present invention.

FIG. 1 shows schematically a boiler plant 10, with a circulating fluidized bed combustor 12. In a circulating fluidized bed combustor, fuel, bed material and possible sorbent material are fluidized in a furnace 14 with fluidizing air, which is introduced to the furnace by combustion air introduction means 16. Normally, air is introduced to the furnace 14 at multiple levels of the furnace, but for clarity, FIG. 1 only shows the means 16 for introducing air being located at the bottom of the furnace. Exhaust gases produced in the furnace 14 and bed particles entrained with the exhaust gases are discharged through a channel 18 in the upper part of the furnace 14 to a solids separator 20. In the solids separator 20, which is usually a cyclone, most of the bed particles are separated from the exhaust gases and returned to the furnace 14 via a return duct 22.

The exhaust gases are led from the separator 20 to an exhaust gas duct 24, which comprises heat transfer surfaces 26 and 28 for cooling the exhaust gases and for producing steam and heating the fluidizing air 16, respectively. The cooled, exhaust gases are conducted to a dust separator 30, which may be an electrostatic dust separator or a bag filter separator. In dust separator 30, most fly-ash particles and other small dust particles are removed from the flue gases and discharged through an ash discharge 32. The flue gases, now cleaned by the dust separator 30, are led to a stack 34 and released into the environment.

The exhaust gas duct 24 may comprise additional gas cleaning equipment, such as a catalyst for reducing $NO_x$ emissions and a wet scrubber or a spray dryer for reducing $SO_2$ emissions. Such additional gas cleaning equipment is, however, not shown in FIG. 1.

According to a preferred embodiment of the present invention, a solution of chloride-containing salt, dissolved in a solvent such as water, is injected into the channel 18 between the furnace 14 and the particle separator 20 by injection means 36. In the channel 18, the temperature of the exhaust gases is typically at least about 700° C. Thus, the chloride-containing salt rapidly heats to a high temperature, at least to above about 300° C., and dissociates into many kinds of molecules and ions. In some applications, it is advantageous to locate the injection means 36 at the upstream end of the exhaust gas duct 24, but downstream of the separator 20. Preferably, the injection means 36 is located upstream of the first heat exchanger 26.

According to a preferred embodiment of the present invention, the chloride-containing salt is ammonium chloride ($NH_4Cl$), which dissociates in the exhaust gas to at least ammonia ($NH_3$) and chlorine species. When the exhaust gas is cooled with the heat exchangers 26 and 28 to about 370° C., at least a portion of the formed Cl-containing particles, which may include HCl and $Cl_2$ molecules and $Cl^-$ ions, reacts with Hg atoms and forms $HgCl_2$ molecules. The $HgCl_2$ molecules tend to adsorb onto the dust particles remaining in the exhaust gas, and are thus removed from the exhaust with the dust separator 30.

According to a preferred embodiment of the present invention, the ash discharge 32 includes an ash handling system including means 38 for recirculating a portion of the fly ash particles discharged by discharge 32 from the dust collector 30 back to the exhaust gas duct 24. The recirculated fly ash is, preferably, injected into a downstream portion 40 of the exhaust gas duct 24. The fly ash recirculation means may include a treatment device 42 for treating the recirculated fly ash. Treatment device 42 for treating the fly ash may be a separator to screen the smallest fly ash particles to be injected into the exhaust gas duct 24. Also, it is possible to add substances which catalyze elemental mercury oxidation, such as trace metal oxides $Fe_2O_3$ or CuO, to the recirculated fly ash.

The chloride-containing salt, injected by means 36, may also be selected from a group consisting of sodium chloride (NaCl), potassium chloride (KCl) and calcium chloride ($CaCl_2$). When injected into a high temperature zone of the exhaust gas duct 24, these salts rapidly form molecules and ions, which can react with Hg atoms and form $HgCl_2$ molecules. The $HgCl_2$ molecules tend to adsorb onto the fly ash particles and thus, can be collected by the dust separator 30.

When the chloride-containing salt is injected at an early stage of the exhaust gas duct 24, the high temperature of the exhaust gases causes rapid dissociation of the molecules. This early injection location also guarantees a long retention time for the solution so that all salt dissociation has taken place when the exhaust gases are cooled to the onset temperature of the $HgCl_2$ formation, which is about 370° C.

When $NH_4Cl$ is used as the chloride-containing salt, the resulting formation of $NH_3$ molecules can be used for non-catalytic $NO_x$ reduction. Specifically, the $NH_3$ molecules formed at a sufficiently high temperature, preferably above about 700° C., convert nitrogen oxides to $N_2$ and $H_2O$. Also, the $NH_3$ may increase the amount of particle-bound mercury in the flue gas.

The chloride-containing salt solution injection means 36 may include means (not shown) for heating the solution to some extent, for example, from about 100° C. to about 200° C., prior to its injection into the flue gas duct 24. Higher initial temperatures of the solution speed up the dissociation of the salt into many ions and molecules in the flue gas duct, thus assuring that the desired chlorine compounds and ions form before the flue gas is cooled to about 370° C., at which significant $HgCl_2$ formation begins.

The reactor 12 does not have to be a circulating fluidized bed combustor. It can also be a bubbling fluidized bed combustor, a fluidized bed gasifier, a pulverized fuel combustor or gasifier, or a waste incinerator. According to the first preferred embodiment of the present invention, the chloride-containing salt solution is injected into the exhaust gas line of any of the above-mentioned, or other suitable, reactors, at a location at which the temperature of the exhaust gas is at least about 650° C. Such location is preferably immediately downstream of the furnace 14, but, in some applications, may be later in the exhaust gas duct 24, and is preferably upstream of a first heat exchanger 26.

Figure 2:
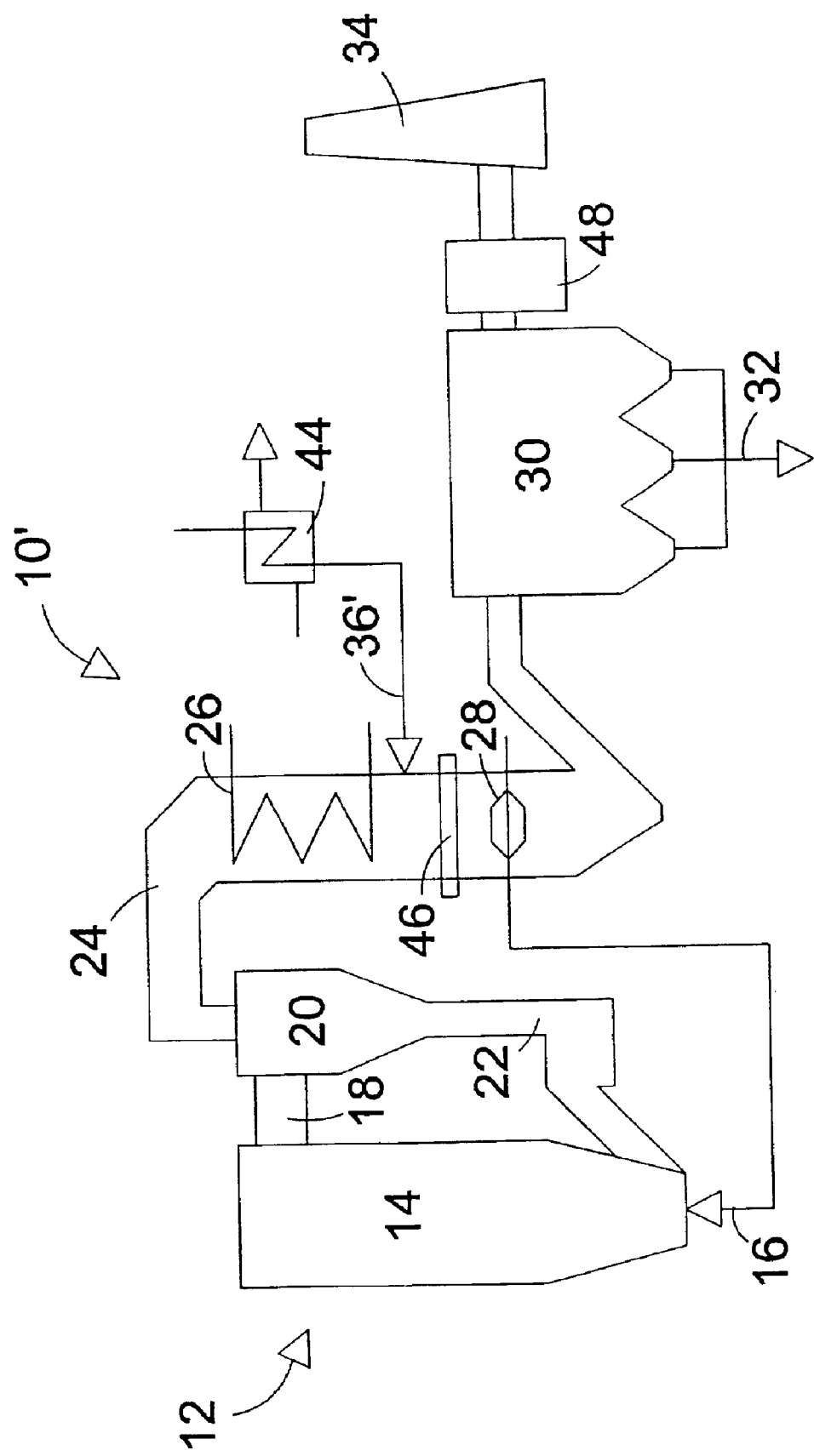
FIG. 2 shows schematically a boiler plant according to a second preferred embodiment of the present invention.

FIG. 2 shows schematically a boiler plant 10' according to a second preferred embodiment of the present invention. The boiler plant 10' differs from that shown in FIG. 1 mainly in that the exhaust gas duct 24 comprises a catalyst unit 46 for providing catalytic $NO_x$ reduction, and that there is a wet scrubber 48 for $SO_2$ reduction downstream of the dust separator 30. An alternative to the wet scrubber 48 is a spray dryer upstream of a dust separator. Although FIG. 2 does not show a fly ash recirculation system 38, as shown in FIG. 1, such a system could be incorporated in the boiler plant 10', or in other plants to which the present invention is applied, as well.

According to the second preferred embodiment of the present invention, as shown in FIG. 2, a solution of chloride-containing salt dissolved in a solvent such as water is injected into the exhaust gas duct 24 by means 36' to a location downstream of the heat exchanger 26, at which location the temperature of the exhaust gas is below about 650° C., and, preferably, above about 370° C. In order to guarantee that the chloride-containing salt is dissociated into the required molecules and ions before the exhaust gas is cooled to about 370° C., the solution is heated by heat exchanger 44 to a temperature of at least about 300° C., before it is injected into the exhaust gas duct 24.

The chloride-containing salt solution injected into the duct 24 by means 36' may be ammonium chloride ($NH_4Cl$). When heated by heater 44, ammonium chloride dissociates and forms, e.g., $NH_3$ molecules. Thus, the injection of dissociated ammonium chloride salt solution upstream of a $NO_x$ catyalyst unit provides $NH_3$ molecules readily available for SCR $NO_x$ reduction. In many applications of the present invention, the chloride-containing salt may also be selected from a group consisting of sodium chloride (NaCl), potassium chloride (KCl) and calcium chloride ($CaCl_2$).

Figure 3:
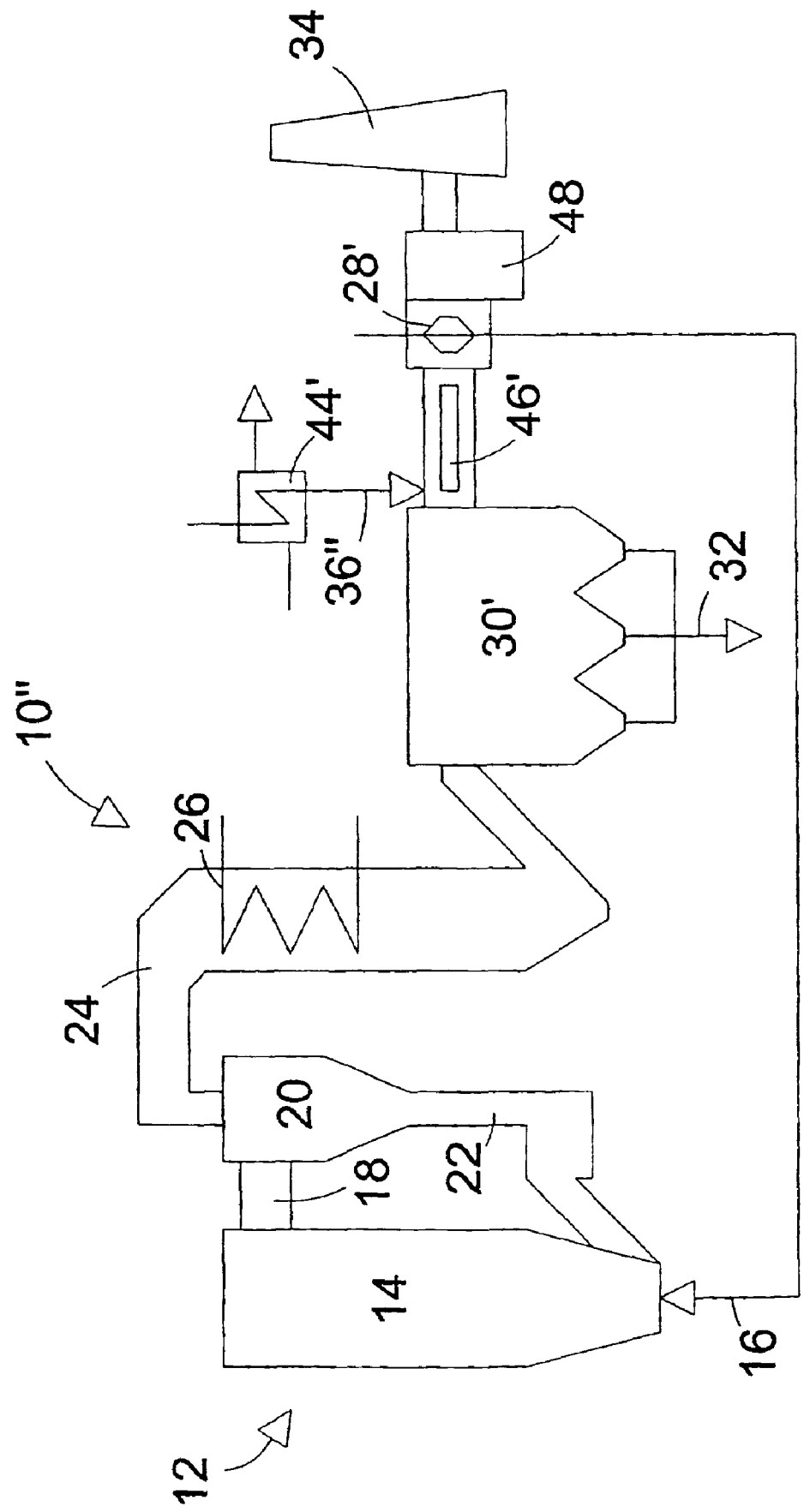
FIG. 3 shows schematically a boiler plant according to a third preferred embodiment of the present invention.

FIG. 3 shows schematically a boiler plant 10'' according to a third preferred embodiment of the present invention. FIG. 3 shows a method of performing mercury reduction in a boiler plant having a dust separator 30' downstream of the first heat exchanger 26, which is at a higher temperature than that in the embodiments shown in FIGS. 1 and 2. Correspondingly, a $NO_x$ catyalyst unit 46' and an air heater 28' are located downstream of the dust separator 30'. According to FIG. 3, a wet scrubber 48 is located downstream of the $NO_x$ catyalyst unit 46'. The wet scrubber 48 could also be replaced by, for example, a spray dryer and an additional particle separator.

According to the third preferred embodiment of the present invention, shown in FIG. 3, the chloride-containing salt solution is injected by means 36'' into the portion of the exhaust gas duct 24, which is downstream of the dust separator 30' and upstream of the $NO_x$ catyalyst unit 46'. When the chloride-containing salt solution is heated by heater 44' to at least about 300° C., the solution dissociates into many types of molecules and ions prior to its injection by means 36'' into the above-noted portion of the exhaust gas duct 24. The Cl-containing particles, including one or more of HCl and $Cl_2$ molecules and $Cl^-$ ions, formed by dissociation of the salt or salts, are readily available for forming $HgCl_2$ molecules with the mercury in the exhaust gas. Also, the possibly formed $NH_3$ is readily available for SCR $NO_x$ reduction in the catalyst 46'.

While the invention has been herein described by way of examples in connection with what are at present considered to be the most preferred embodiments, it is to be understood that the invention is not limited to the disclosed embodiments, but is intended to cover various combinations and/or modifications of its features and other applications within the scope of the invention as defined in the appended claims.

I claim:

1. A method of removing mercury from flue gas containing mercury and particulate solids emanating from a fossil-fuel energy conversion plant and passing through a flue gas duct, said method comprising the following steps:

(a) contacting the mercury in the flue gas with a solution containing at least one chloride-containing salt dissolved in a solvent by injecting the solution into the flue gas duct at an injection location, in order to oxidize mercury into $HgCl_2$;

(b) heating the solution to at least about 300° C. by either (b1) selecting the injection location so that the flue gas temperature in the flue gas duct at the injection location is from about 370° C. to about 650° C., and heating the solution to at least about 300° C. prior to injecting the solution into the flue gas duct, or (b2) selecting the injection location so that the flue gas temperature in the flue gas duct at the injection location is from about 650° C. to about 980° C., thereby rapidly heating the solution to at least about 300° C. upon injection of the solution into the flue gas duct; and (c) removing oxidized mercury from the flue gas with means for removing particulate solids from the flue gas.

2. A method according to claim 1, wherein step (b2) further comprises heating the solution to at least about 100° C. prior to injecting the solution into the flue gas duct.

3. A method according to claim 1, wherein the solvent is water.

4. A method according to claim 1, wherein the chloride-containing salt is ammonium chloride ($NH_4Cl$).

5. A method according to claim 4, wherein step (b) comprises selecting the injection location so that the flue gas temperature in the flue gas duct at the injection location is from about 650° C. to about 980° C., thereby rapidly heating the solution to at least about 300° C. upon injection of the solution into the flue gas duct to dissociate the $NH_4Cl$ to at least $NH_3$ and chlorine species, and allowing the formed $NH_3$ to reduce $NO_x$ levels of the flue gas by a selective non-catalytic reduction process.

6. A method for removing mercury according to claim 4, wherein step (b) comprises heating the solution to at least about 300° C. prior to injecting the solution into the flue gas duct, and selecting the injection location to be upstream of a $NO_x$ catyalyst unit where the flue gas temperature in the flue gas duct is from about 370° C. to about 650° C.

7. A method according to claim 1, further comprising selecting the chloride-containing salt from a group consisting of sodium chloride (NaCl), potassium chloride (KCl) and calcium chloride ($CaCl_2$).

8. A method according to claim 1, further comprising recirculating a portion of particulate solids removed from the flue gas back to the flue gas duct.

9. A method according to claim 8, further comprising treating recirculated particulate solids prior to injection back to the flue gas duct by screening out relatively larger particles from the recirculated solids.

10. A method according to claim 8, further comprising treating recirculated particulate solids prior to injection back to the flue gas duct by adding substances that catalyze mercury oxidation.

11. A method according to claim 1, further comprising removing oxidized mercury from the flue gas by a wet scrubber.

12. A method according to claim 1, further comprising removing oxidized mercury from the flue gas by a spray dryer.

* * * * *